(12) United States Patent
Dimashkie et al.

(10) Patent No.: US 10,337,867 B1
(45) Date of Patent: Jul. 2, 2019

(54) SYMMETRICAL WAVELENGTH MULTIPLEXOR FOR FIBER OPTIC GYRO SOURCE

(71) Applicants: Bassam S. Dimashkie, Simi Valley, CA (US); Steven M. Kim, Santa Clarita, CA (US); Manfred Schiruska, West Hills, CA (US)

(72) Inventors: Bassam S. Dimashkie, Simi Valley, CA (US); Steven M. Kim, Santa Clarita, CA (US); Manfred Schiruska, West Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/952,355

(22) Filed: Apr. 13, 2018

(51) Int. Cl.
*G01C 19/72* (2006.01)
*G02B 6/293* (2006.01)

(52) U.S. Cl.
CPC ......... *G01C 19/721* (2013.01); *G02B 6/2938* (2013.01)

(58) Field of Classification Search
CPC .... G01C 19/72; G01C 19/721; G01C 19/722; G02B 26/00
See application file for complete search history.

(56) References Cited

U.S. PATENT DOCUMENTS

| | | | | |
|---|---|---|---|---|
| 5,311,603 A | * | 5/1994 | Fidric | G01C 19/721 372/6 |
| 5,949,930 A | * | 9/1999 | Cordova | G01C 19/721 356/460 |
| 6,023,359 A | | 2/2000 | Asahi | |
| 6,144,788 A | * | 11/2000 | Ang | G01C 19/721 356/477 |
| 6,310,994 B1 | | 10/2001 | Jones et al. | |
| 7,746,476 B2 | | 6/2010 | Demers et al. | |
| 2003/0091321 A1 | * | 5/2003 | Ang | G01C 19/721 385/147 |
| 2004/0196544 A1 | * | 10/2004 | Rosolem | H01S 3/06754 359/347 |
| 2007/0229838 A1 | * | 10/2007 | Greening | G01C 19/64 356/460 |

\* cited by examiner

*Primary Examiner* — Jonathan M Hansen
(74) *Attorney, Agent, or Firm* — Tarolli, Sundheim, Covell & Tummino LLP

(57) ABSTRACT

An apparatus includes a symmetrical wavelength multiplexor (SWM) that includes a first port that receives a depolarized beam of light of a first center wavelength for a first wavelength range. A second port of the SWM receives a second center wavelength of light for a second wavelength range that is greater than the first wavelength range. A third port of the SWM provides a substantially symmetrical wavelength output to drive a fiber optic gyroscope (FOG) in accordance with the second center wavelength. The depolarized beam of light of the first center wavelength travels from the first port to the second port of the SWM and light of the second center wavelength travels from the second port to the third port of the SWM. The SWM mitigates spectral asymmetries between orthogonal axes of the second wavelength.

14 Claims, 5 Drawing Sheets

SYMMETRICAL WAVELENGTH MULTIPLEXOR FOR FIBER OPTIC GYRO SOURCE

TECHNICAL FIELD

This disclosure relates to a light source, and more particularly to a symmetrical wavelength multiplexor to provide a stabilized light source to drive a fiber optic gyroscope.

BACKGROUND

An interferometric fiber optic gyroscope includes a light source that provides an optical signal to a fiber optic sensing coil. A typical light source includes a laser diode that provides pump light to a gain fiber. The gain fiber includes a dopant that absorbs pump light and then emits an optical signal that is suitable for delivery. Within the FOG, a multifunction integrated optic chip (MIOC) is connected to the fiber optic sensing coil. The MIOC includes components such as a polarizer, a phase modulator and a Y-coupler (splitter/combiner) that are used in processing and controlling optical signals input to and from the fiber optic sensing coil. The output of the FOG is an intensity that can be used to determine the phase difference between the two counter-propagating waves. A portion of the output is returned to the light source through a splitter and a second portion of the output is provided to a photodetector through the splitter for measuring the phase difference. The rotation rate of the coil about its sensing axis is obtained by dividing this phase difference by a scale factor of the FOG, referred to as the Sagnac scale factor.

The scale factor stability of fiber optic gyroscopes (FOGs) is affected by changes in the polarization state of the light in the fiber between the optical source and the MIOC. Polarization dependent loss in optical components, a type of unwanted optical filtering, results in asymmetric optical polarization. Degradation of polarization state symmetry changes the scale factor of the FOG via optical filtering of the light when the traversing first the section between the source and the MIOC then traversing the polarizing MIOC itself. This optical filtering can lead to short term scale factor instability and long term degradation of the scale factor repeatability.

Another area where gyroscopic errors can occur is in the optical source used to drive the MIOC. For instance, some optical sources use a wavelength division multiplexor (WDM) in an attempt to provide a stabilized light source to drive the MIOC. The WDM is constructed as a fused taper coupler where such construction is prone to large polarization dependent loss resulting in wavelength asymmetry when evaluated through an optical polarizer. Such construction is also prone to wavelength instability as a function of time and temperature resulting in a net gyro scale factor error when used to drive the FOG. The cross coupling point along the optical path results in a temperature varying sinusoidal gyro scale factor error.

SUMMARY

This disclosure relates to a symmetrical wavelength multiplexor to provide a stabilized light source to drive a fiber optic gyroscope. In one example, an apparatus includes a symmetrical wavelength multiplexor (SWM) that includes a first port that receives a depolarized beam of light of a first center wavelength for a first wavelength range. A second port of the SWM receives a second center wavelength of light for a second wavelength range that is greater than the first wavelength range. A third port of the SWM provides a substantially symmetrical wavelength output to drive a fiber optic gyroscope (FOG) in accordance with the second center wavelength. The depolarized beam of light of the first center wavelength travels from the first port to the second port of the SWM and light of the second center wavelength travels from the second port to the third port of the SWM. The SWM mitigates spectral asymmetries between orthogonal axes of the second wavelength.

In another example, a system includes a light source for producing a beam of light of a first center wavelength for a first wavelength range. The system includes an optical converter that receives the depolarized beam of light of the first center wavelength to convert the depolarized beam of light into a second center wavelength for a second wavelength range that is greater than the first wavelength range. The system includes a symmetrical wavelength multiplexor (SWM) with a first port coupled to the light source, a second port coupled to the optical converter, and a third port that provides a substantially symmetrical wavelength output to drive a fiber optic gyroscope (FOG) in accordance with the second center wavelength. The depolarized beam of light of the first center wavelength travels from the first port to the second port of the SWM and light of the second center wavelength travels from the second port to the third port of the SWM. The SWM mitigates spectral asymmetries between orthogonal axes over the second range of wavelengths.

In yet another example, a method includes receiving a depolarized beam of light of a first center wavelength for a first wavelength range at a first port of a symmetrical wavelength multiplexor (SWM). The method includes receiving a second center wavelength of light for a second wavelength range that is greater than the first wavelength range at a second port of the SWM. The method includes generating a substantially symmetrical wavelength output (SWO) at a third port of the SWM in response to receiving the second center wavelength of light for the second wavelength range from the second port of the SWM. The method includes sourcing a fiber optic gyroscope (FOG) via the SWO. The SWM mitigates spectral asymmetries of the SWO between orthogonal axes over the second wavelength range.

DETAILED DESCRIPTION

This disclosure relates to a symmetrical wavelength multiplexor to provide a stabilized light source to drive a fiber optic gyroscope (FOG). In one aspect, a fiber optic gyro source apparatus and system can be provided that utilizes a faraday rotator and/or filter in the SWM to achieve optical steering for optical multiplexing in an erbium doped fiber (or other rare earth doping) amplified spontaneous emission (ASE) optical source. The fiber optic gyro source provides a conditioned and stabilized light source to a sensor portion of the FOG. Current systems use a wavelength division multiplexor (WDM) comprised of a fused taper coupler to direct the light based on the wavelength. However, current systems produce wavelength asymmetries that cause errors in the system. Due to the fused taper approach, the WDM is prone to large polarization dependent loss (PDL) and wavelength instability over time and temperature which causes wavelength asymmetry and a net gyro scale factor error.

The present disclosure provides a conditioned light source for a fiber optic gyro sensor where the SWM replaces the WDM and an isolator unit with alternate wavelength division structure (e.g., an optical circulator) to provide improved PDL and wavelength symmetry. The alternative wavelength division structure provides higher levels of wavelength symmetry compared to a WDM. The depolarized beam of light of the first center wavelength will then travel from the light source through the SWM (e.g. faraday rotator) which acts as a multiplexor. The SWM is connected to the light source through a first port, to an erbium doped fiber in one example ("EDF") through a second port, and to the output of the fiber optic gyro source through a third port. The depolarized beam of light of the first center wavelength will travel through the first port and out of the second port into the EDF. The EDF converts the light to produce a broad spectrum of light at a second center wavelength (e.g., 1550 nm).

The beam of light of the second center wavelength will either be directed towards the SWM or away from the SWM. Light directed away from the SWM including remaining light from the beam of light of the first wavelength can be terminated. The beam of light of the second center wavelength directed towards the SWM enters through the second port of the SWM and passes through to the third port of the SWM as the output of the fiber optic gyro source. The output of the fiber optic gyro source provides the conditioned light source for the sensor portion of the FOG. By utilizing the SWM, spectral asymmetry issues and errors associated therewith that arise due to the WDM are mitigated which increases the accuracy of the FOG.

Figure 1:
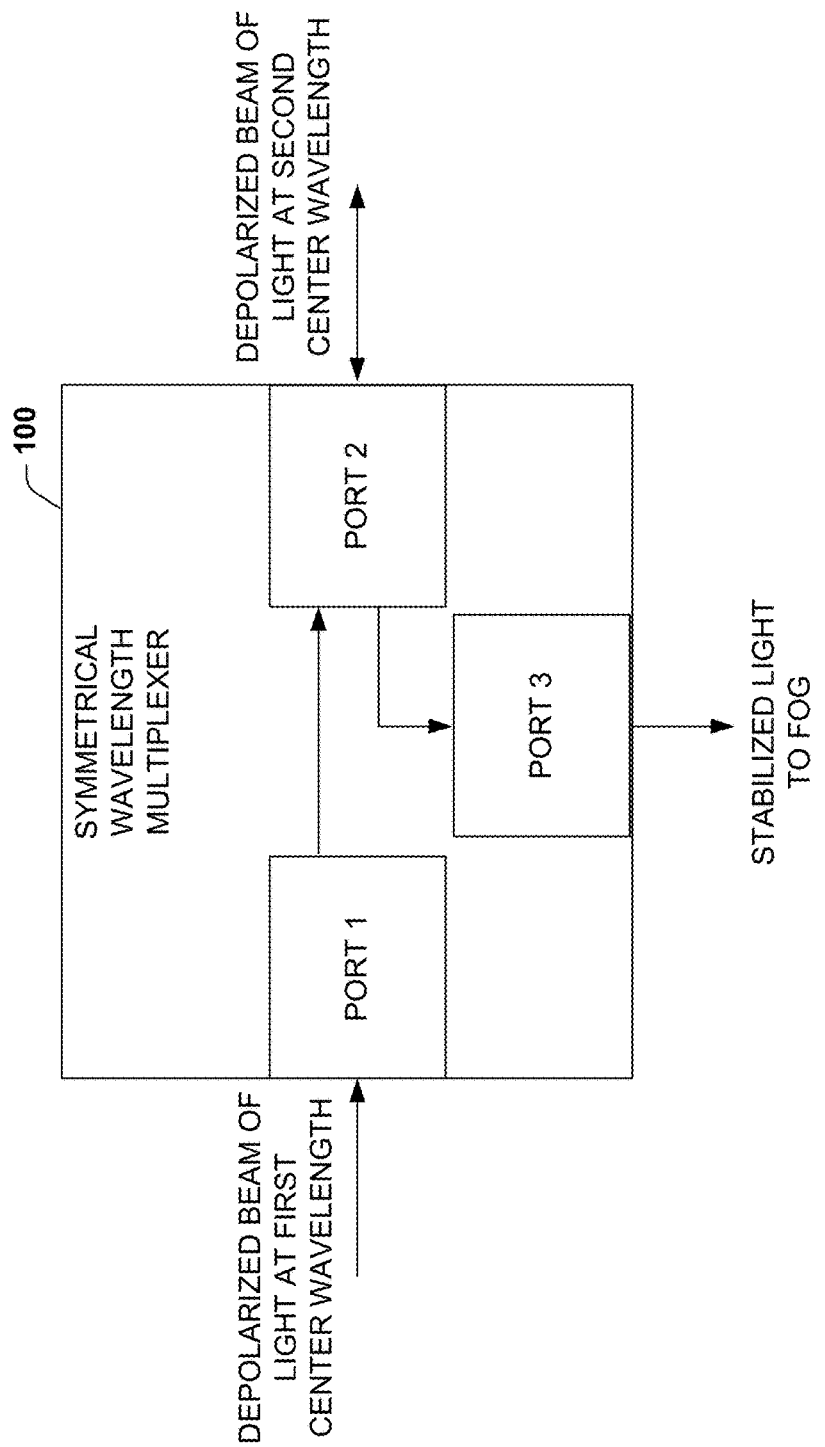
FIG. 1 illustrates an example apparatus to provide a stabilized light source to a fiber optic gyroscope.

FIG. 1 illustrates an example apparatus that includes a symmetrical wavelength multiplexor 100 to provide a stabilized light source to a fiber optic gyroscope. The symmetrical wavelength multiplexor (SWM) 100 includes a first port (PORT 1) that receives a depolarized beam of light of a first center wavelength for a first wavelength range. For example, the first center wavelength can be generated as 1480 nanometers (nm) (or other wavelength) center wavelength over a fairly narrow range of wavelengths of about 2 or 3 nm. A second port (PORT 2) of the SWM 100 receives a second center wavelength of light for a second wavelength range that is greater than the first wavelength range. The second wavelength can be generated at 1550 nm in one example yet in a broader wavelength range of about 20 nm to 50 nm, for example.

Figure 5:
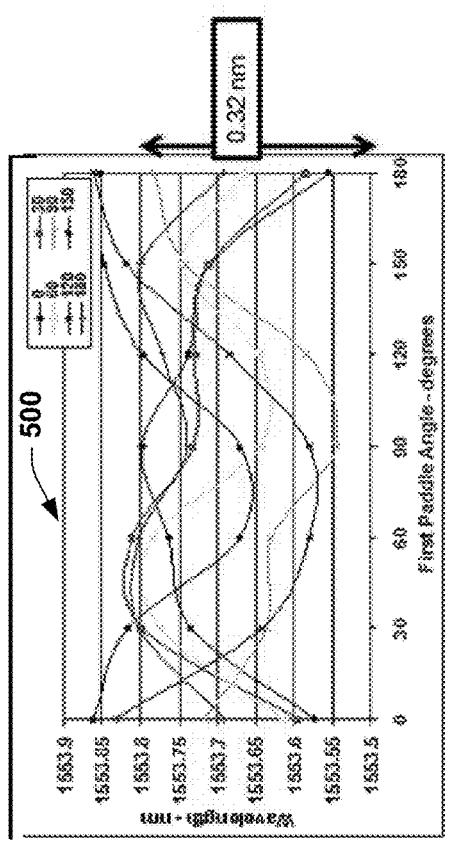
FIG. 5 illustrates a performance diagram illustrating wavelength asymmetry performance of a wavelength division multiplexor.

A third port (PORT 3) of the SWM 100 provides a substantially symmetrical wavelength output to drive a fiber optic gyroscope (FOG) via the second center wavelength. The SWM 100 mitigates spectral asymmetries between wavelengths over the second wavelength range. By reducing spectral asymmetries from the output of PORT 3, when used to drive the FOG, gyroscopic errors over time and temperature can be reduced. As used herein, the term spectral asymmetry refers to errors that occur between wavelengths that are generated over the second wavelength range described herein. This can include amplitude and/or phase errors between the different wavelengths within the second range. Wavelength asymmetry is an inherent feature of a wavelength division multiplexor (WDM) that utilizes a fused taper fiber construction. In sharp contrast to the fused taper fiber construction of the WDM, the SWM 100 utilizes technologies such as Faraday rotators, bulk optics trains, birefringent wedges, magnets, and/or thin-filmed mirrors to generate a substantially symmetrical wavelength output from PORT 2 of the SWM 100. A prior art performance diagram of FIG. 5 illustrates aspects of waveform asymmetry of a WDM that is contrasted with an example of waveform symmetry of an SVM 100 in FIG. 6.

In one example, the SWM 100 can be an optical circulator having a first port, second port, and third port, wherein the depolarized beam of light of the first center wavelength travels from the first port to the second port of the optical circulator and light of the second center wavelength travels from the second port to the third port of the optical circulator. In another example, the SWM 100 can be a wavelength divisions isolator hybrid (WDIH) having a first port, a second port, and a third port, wherein the depolarized beam of light of the first center wavelength travels from the first port to the second port of the WDIH and light of the second center wavelength travels from the second port to the third port of the WDIH. Examples of the optical circulator and WDIH are shown in FIGS. 3 and 4, respectively.

Figure 2:
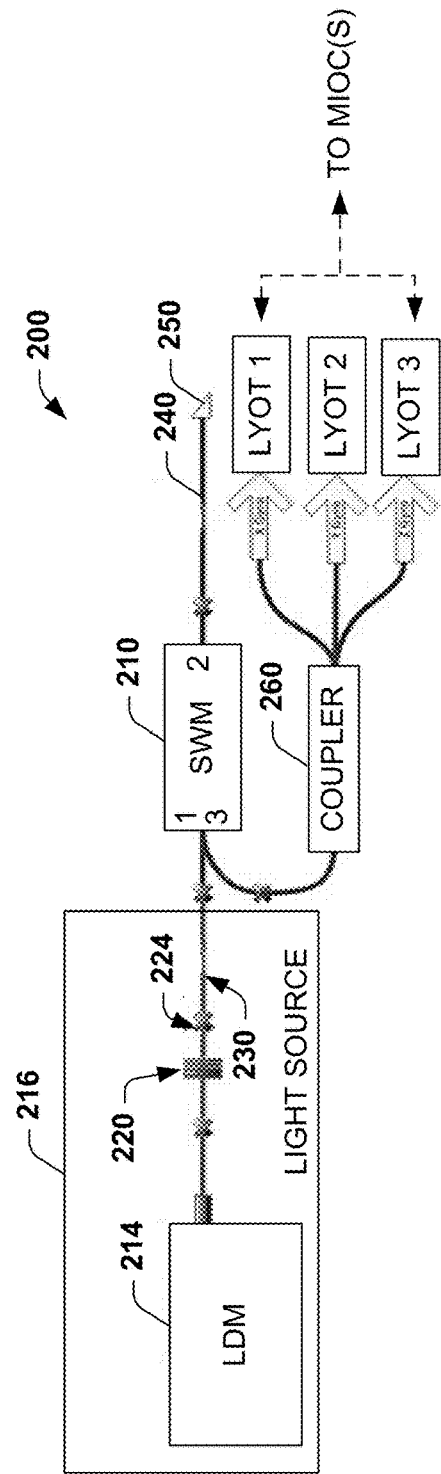
FIG. 2 illustrates an example system to provide a stabilized light source to a fiber optic gyroscope.

FIG. 2 illustrates an example system 200 to provide a stabilized light source to a fiber optic gyroscope. An SWM 210 is provided having ports labeled 1, 2, and 3 as previously described herein. A light source 214 can be provided for producing a beam of light of the first center wavelength (e.g., 1480 nm) for the first wavelength range (e.g., +/−2 nm). In one example, the light source 214 can include a laser diode module (LDM) 216. A fiber optic grating 220 (e.g., Bragg Grating) can be placed in the path of the beam of light of the first center wavelength for wavelength stabilization to produce a stabilized beam of light of the first center wavelength. An example fiber coupler is shown at 224 and induces a 45 degree phase shift in one example. Also, a waveplate 230 (e.g., section of fiber) can be inserted in the path of the stabilized beam of light of the first center wavelength for depolarization to produce a depolarized beam of light of the first center wavelength entering port 1 of the SVM 210. The waveplate 230 can be a quarter waveplate and implemented as a polarization maintaining optical fiber, for example.

An optical converter 240 receives the depolarized beam of light of the first center wavelength via port 2 of the SVM 210 to convert the depolarized beam of light into a second center wavelength for the second wavelength range that is greater than the first wavelength range. The optical converter 240 can be terminated via fiber cleave 250. In an example, the optical converter 240 can be implemented as a single mode fiber. The optical converter can include an erbium doped fiber (EDF) or an yttrium doped fiber (YDF) to convert the depolarized beam of light into a second center wavelength for the second wavelength range that is greater than the first wavelength range. An optical coupler 260 (e.g., 1×3 coupler) can be provided that is driven by the third port of the SVM 210 to generate sensor signals shown as X, Y and Z gyro signals, to drive a fiber optic gyroscope (FOG). In one example, separate Lyot depolarizers 1, 2 and 3 respectively can be provided to condition the sensor signals to drive the FOG which can b implemented as a multifunction integrated optic chip (MIOC) connected to a fiber optic sensing coil in an example. In another example, the Lyot depolarizers 1, 2 and 3 can be eliminated with the FOG being driven directly via the coupler 260.

Figure 3:
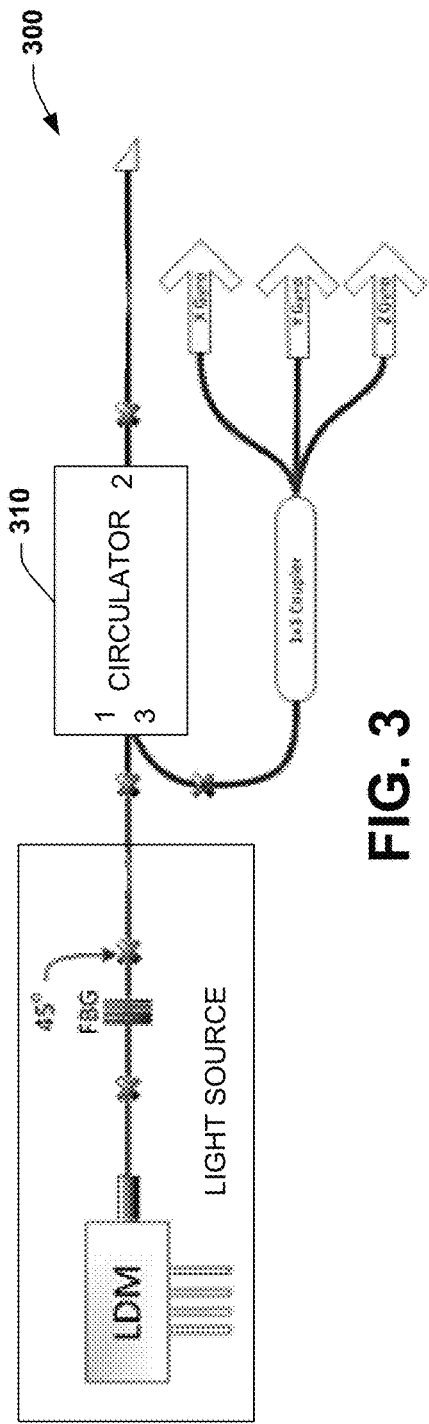
FIG. 3 illustrates an example system utilizing an optical circulator as a symmetrical wavelength multiplexor to provide a stabilized light source.
Figure 4:
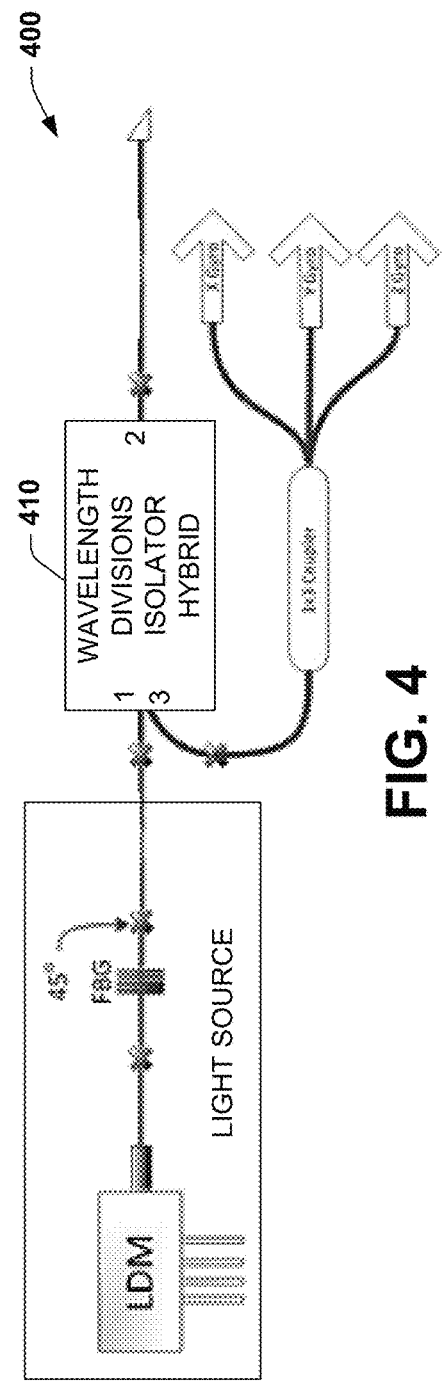
FIG. 4 illustrates an example system utilizing a wavelength divisions isolator hybrid (WDIH) as a symmetrical wavelength multiplexor to provide a stabilized light source.

FIG. 3 illustrates an example system 300 utilizing an optical circulator as a symmetrical wavelength multiplexor to provide a stabilized light source. For purposes of brevity, each component of the system 300 will not be described as such description is provided with respect to FIG. 2. In this example, the SWM is an optical circulator 310 having a first port (1), second port (2), and third port (3). The depolarized beam of light of the first center wavelength described herein travels from the first port to the second port of the optical circulator 310 and light of the second center wavelength travels from the second port to the third port of the optical circulator.

FIG. 4 illustrates an example system utilizing a wavelength divisions isolator hybrid (WDIH) as a symmetrical wavelength multiplexor to provide a stabilized light source. For purposes of brevity, each component of the system 400 will not be described as such description is provided with respect to FIG. 2. In this example, the SWM is a wavelength divisions isolator hybrid (WDIH) 410 having a first port (1), a second port (2), and a third port (3). The depolarized beam of light of the first center wavelength described herein travels from the first port to the second port of the WDIH 410 and light of the second center wavelength travels from the second port to the third port of the WDIH.

FIG. 5 illustrates a performance diagram 500 illustrating wavelength asymmetry performance of a wavelength division multiplexor (WDM). The X axis indicates a paddle angle of a polarization loop controller in degrees and the Y axis illustrates wavelength deviations in nanometers. Output from the WDM was fed through a polarizer which was analyzed by a spectrum analyzer to produce the diagram 500. As shown, there is approximately 0.32 nanometers of deviation in the waveform output due to the fused taper fiber construction of the WDM causing spectral asymmetries as previously described herein. As described previously, spectral asymmetry refers to errors that occur between wavelengths that are generated over the second wavelength range described herein. This can include amplitude and/or phase errors between the different wavelengths within the second range. Wavelength asymmetry is an inherent feature of a wavelength division multiplexor (WDM) that utilizes a fused taper fiber construction that produces the 0.32 nanometer deviation depicted in the diagram 500.

Figure 6:
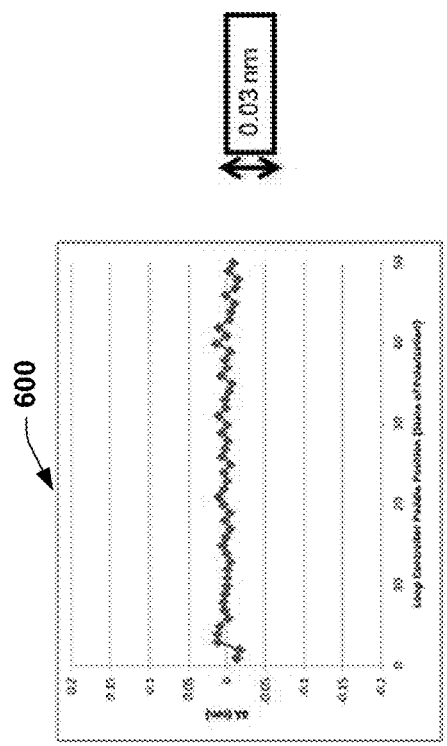
FIG. 6 illustrates a performance diagram illustrating wavelength symmetry performance of an optical circulator employed as a symmetrical wavelength multiplexor.

FIG. 6 illustrates a performance diagram 600 illustrating wavelength symmetry performance of an optical circulator employed as a symmetrical wavelength multiplexor (SWM). Similar to FIG. 5, the X axis indicates a paddle angle in degrees and the Y axis illustrates wavelength deviations in nanometers. In this example, output from the SWM was fed through a polarizer which was analyzed by a spectrum analyzer to produce the diagram 600. As shown, there is about 0.03 nanometer of deviation in the waveform output due to the Faraday rotator construction of the SWM (e.g., optical circulator) providing spectral symmetry at the output of the SWM which is in stark contrast to the fused taper performance of the WDM depicted in FIG. 5. In addition to Faraday rotators, the SWM's described herein can include bulk optics trains, birefringent wedges, magnets, and/or thin-filmed mirrors to generate a substantially symmetrical wavelength output from the SWM.

Figure 7:
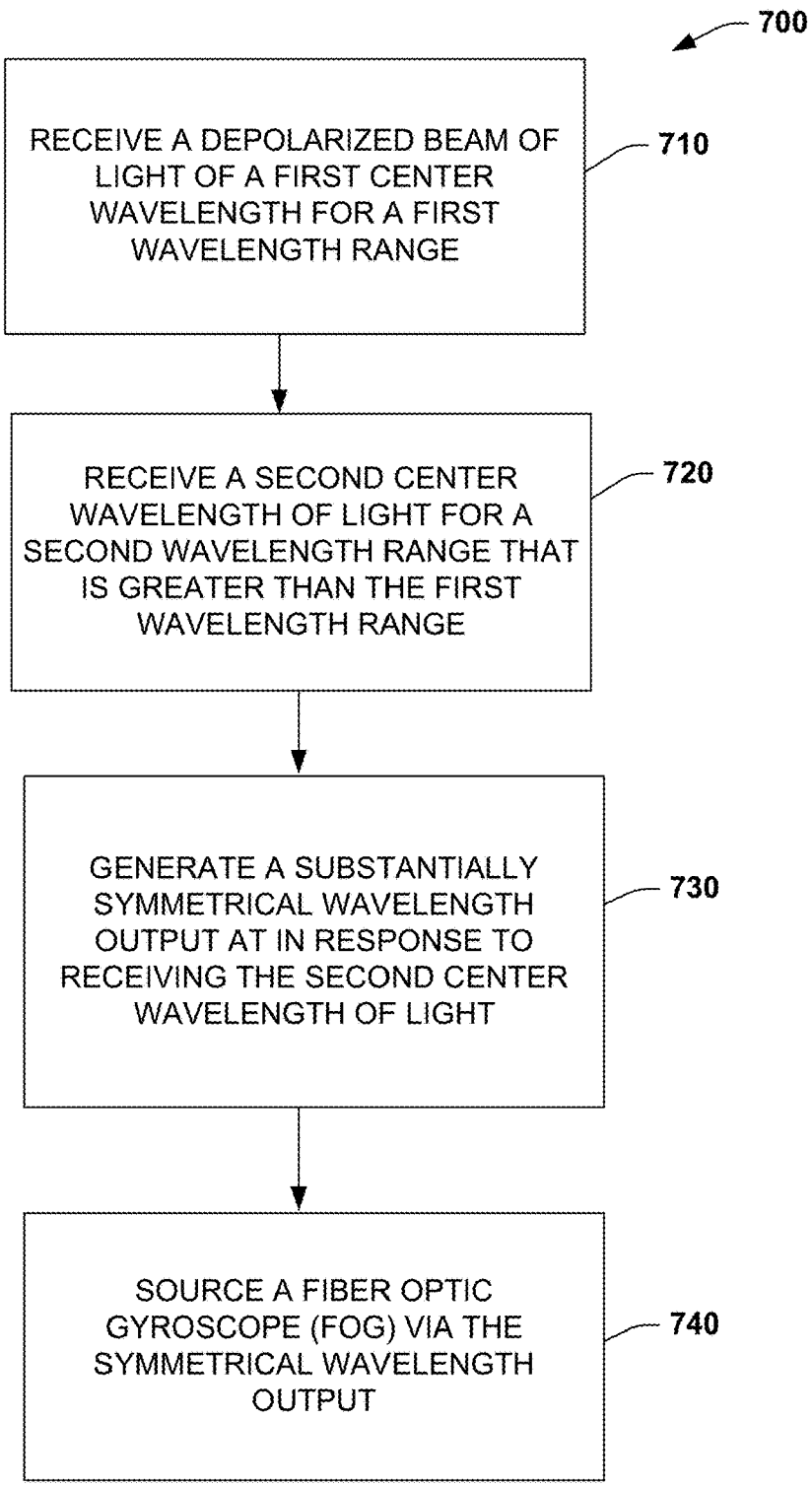
FIG. 7 illustrates an example method to provide a stabilized light source to a fiber optic gyroscope.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein.

FIG. 7 illustrates an example method 700 to provide a stabilized light source to a fiber optic gyroscope. At 710, the method includes receiving a depolarized beam of light of a first center wavelength for a first wavelength range at a first port of a symmetrical wavelength multiplexor (SWM) (e.g., via PORT 1 of SVM 100 of FIG. 1). At 720, the method 700 includes receiving a second center wavelength of light for a second wavelength range that is greater than the first wavelength range at a second port of the SWM (e.g., via PORT 2 of SVM 100 of FIG. 1). At 730, the method 700 includes generating a substantially symmetrical wavelength output (SWO) at a third port of the SWM in response to receiving the second center wavelength of light for the second wavelength range from the second port of the SWM (e.g., via PORT 3 of SVM 100 of FIG. 1). At 740, the method 700 includes sourcing a fiber optic gyroscope (FOG) via the SWO (e.g., via PORT 1 of SVM 100 of FIG. 1). As mentioned previously, the SWM mitigates spectral asymmetries of the SWO between orthogonal axes over the second wavelength range.

In one example, the SWM can be an optical circulator having a first port, second port, and third port, wherein the depolarized beam of light of the first center wavelength travels from the first port to the second port of the optical circulator and light of the second center wavelength travels from the second port to the third port of the optical circulator. In another example, the SWM can be a wavelength divisions isolator hybrid (WDIH) having a first port, a second port, and a third port, wherein the depolarized beam of light of the first center wavelength travels from the first port to the second port of the WDIH and light of the second center wavelength travels from the second port to the third port of the WDIH.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus, comprising:
 a symmetrical wavelength multiplexor (SWM) that includes a first port that receives a depolarized beam of light of a first center wavelength for a first wavelength range, wherein the SWM is an optical circulator,
 a second port of the SWM receives a second center wavelength of light for a second wavelength range that is greater than the first wavelength range, and
 a third port of the SWM provides a light having a substantially symmetrical wavelength to drive a fiber optic gyroscope (FOG) in accordance with the second center wavelength, wherein the depolarized beam of light of the first center wavelength travels from the first port to the second port of the SWM and light of the second center wavelength travels from the second port to the third port of the SWM, wherein the SWM mitigates spectral asymmetries between orthogonal axes of the second wavelength.

2. The apparatus of claim 1, further comprising a light source for producing a beam of light of the first center wavelength for the first wavelength range, wherein the light source is a laser diode module (LDM).

3. The apparatus of claim 1, further comprising an optical converter that receives a depolarized beam of light of the first center wavelength to convert the depolarized beam of light into a second center wavelength for the second wavelength range that is greater than the first wavelength range, wherein the optical converter is implemented as a single mode fiber.

4. The apparatus of claim 3, wherein the optical converter includes an erbium doped fiber (EDF) or an yttrium doped fiber (YDF) to convert the depolarized beam of light into a second center wavelength for the second wavelength range that is greater than the first wavelength range.

5. The apparatus of claim 1, further comprising an optical coupler that is driven by the third port of the SWM to generate sensor signals to drive a fiber optic gyroscope (FOG).

6. The apparatus of claim 1, further comprising separate Lyot depolarizers to condition the sensor signals to drive the FOG.

7. A system, comprising:
a light source for producing a depolarized beam of light of a first center wavelength for a first wavelength range;
an optical converter that receives the depolarized beam of light of the first center wavelength to convert the depolarized beam of light into a second center wavelength for a second wavelength range that is greater than the first wavelength range; and
a symmetrical wavelength multiplexor (SWM) corresponding to a wavelength divisions isolator hybrid (WDIH) with a first port coupled to the light source, a second port coupled to the optical converter, and a third port that provides a light having a substantially symmetrical wavelength to drive a fiber optic gyroscope (FOG) in accordance with the second center wavelength, wherein the depolarized beam of light of the first center wavelength travels from the first port to the second port of the SWM and light of the second center wavelength travels from the second port to the third port of the SWM, wherein the SWM mitigates spectral asymmetries between orthogonal axes over the second range of wavelengths.

8. The system of claim 7, wherein the optical converter is implemented as a single mode fiber.

9. The system of claim 7, wherein the optical converter includes an erbium doped fiber (EDF) or an yttrium doped fiber (YDF) to convert the depolarized beam of light into a second center wavelength for the second wavelength range that is greater than the first wavelength range.

10. The system of claim 7, further comprising an optical coupler that is driven by the third port of the SWM to generate sensor signals to drive a fiber optic gyroscope (FOG).

11. A method, comprising:
receiving a depolarized beam of light of a first center wavelength for a first wavelength range at a first port of a symmetrical wavelength multiplexor (SWM), wherein the SWM is an optical circulator;
receiving a second center wavelength of light for a second wavelength range that is greater than the first wavelength range at a second port of the SWM; and
generating a light having a substantially symmetrical wavelength at a third port of the SWM in response to receiving the second center wavelength of light for the second wavelength range from the second port of the SWM; and
sourcing a fiber optic gyroscope (FOG) via the light wherein the SWM mitigates spectral asymmetries of the SWO between orthogonal axes over the second wavelength range.

12. The method of claim 11, further comprising employing a single mode fiber for receiving the second center wavelength of light for the second wavelength range that is greater than the first wavelength range at the second port of the SWM.

13. The method of claim 12, further comprising employing an erbium doped fiber (EDF) or an yttrium doped fiber (YDF) to convert the depolarized beam of light into a second center wavelength for the second wavelength range that is greater than the first wavelength range.

14. The method of claim 11, further comprising generating sensor signals from the third port of the SWM to drive the FOG.

* * * * *